United States Patent
Kawamoto et al.

(10) Patent No.: US 6,710,000 B2
(45) Date of Patent: Mar. 23, 2004

(54) DIELECTRIC CERAMIC COMPOSITION AND CERAMIC CAPACITOR

(75) Inventors: Yasunobu Kawamoto, Tokyo (JP); Koichiro Morita, Tokyo (JP); Kenji Saito, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 100 days.

(21) Appl. No.: 10/092,426

(22) Filed: Mar. 8, 2002

(65) Prior Publication Data

US 2002/0177519 A1 Nov. 28, 2002

(30) Foreign Application Priority Data

Mar. 8, 2001 (JP) ......................................... 2001-064280

(51) Int. Cl.[7] ........................ H01G 4/10; C04B 35/468
(52) U.S. Cl. .................. 501/139; 361/321.4; 361/321.5
(58) Field of Search ....................... 501/139; 361/321.4, 361/321.5

(56) References Cited

U.S. PATENT DOCUMENTS 6,524,983 B2 * 2/2003 Kawamoto et al. ......... 501/138

2002/0016247 A1 * 2/2002 Mizuno et al. ............... 501/32

* cited by examiner

Primary Examiner—David Brunsman
(74) Attorney, Agent, or Firm—Bacon & Thomas

(57) ABSTRACT

In a dielectric ceramic composition comprising: 100 mol % of an oxide of Ba, Ti and Zr; 0.25 to 1.5 mol % of an oxide of Re, Re representing one or more elements selected from the group consisting of Sm, Eu, Gd, Tb, Dy, Ho, Er, Tm, Yb and Y; 0.1 to 0.4 mol % of an oxide of Mg; and 0.03 to 0.6 mol % of oxides of one or more elements selected from the group consisting of Mn, V and Cr, the content of the oxide of the Ba, Ti and Zr is calculated by assuming that the oxide thereof is $Ba(Ti_{1-x}Zr_x)O_3$; the contents of the oxides of the Re and Mg being calculated by assuming that the oxides thereof are $Re_2O_3$ and $MgO$, respectively; the contents of the oxides of the Mn, V and Cr being calculated by assuming that the oxides thereof are $Mn_2O_3$, $V_2O_5$ and $Cr_2O_3$, respectively. A ratio of $Ba/(Ti_{1-x}Zr_x)$ ranges from about 1.000 to about 1.010 and x in $Ti_{1-x}Zr_x$ ranges from about 0.05 to about 0.26.

4 Claims, 1 Drawing Sheet

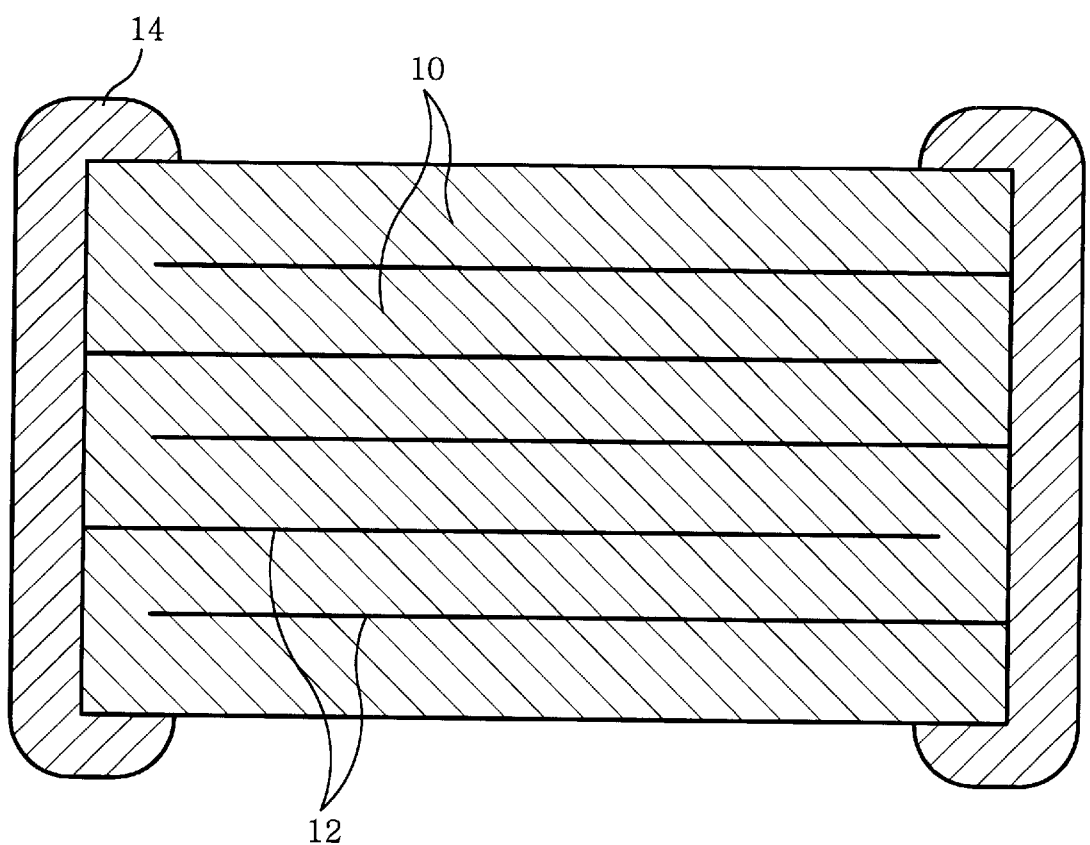

DIELECTRIC CERAMIC COMPOSITION AND CERAMIC CAPACITOR

FIELD OF THE INVENTION

The present invention relates to a ceramic capacitor and ceramic compositions therefor; and, more particularly, to reduction resistive dielectric ceramic compositions suitable for use as a dielectric layer of a ceramic capacitor having internal electrodes made of a base metal such as Ni and a ceramic capacitor fabricated by employing such ceramic compositions as a dielectric layer thereof.

BACKGROUND OF THE INVENTION

Recently, a base metal, e.g., Ni, is widely used in forming internal electrodes of multilayer ceramic capacitors for the purpose of reducing manufacturing costs. In case the internal electrodes are composed of the base metal, it is required that chip-shaped laminated bodies including therein the internal electrodes be sintered in a reductive atmosphere in order to prevent an oxidization of the internal electrodes. Accordingly, a variety of reduction resistive dielectric ceramic compositions have been developed.

Recent trend towards ever more miniaturized and dense electric circuits intensifies a demand for a further scaled down multilayer ceramic capacitor with higher capacitance. Keeping up with such demand, there has been made an effort to fabricate thinner dielectric layers and to stack a greater number of the thus produced dielectric layers.

However, when the dielectric layers are thinned out, a voltage applied to a unit thickness intrinsically increases. Accordingly, the operating life of the dielectric layers is shortened and thus a reliability of the multilayer ceramic capacitor is also deteriorated.

SUMMARY OF THE INVENTION

It is, therefore, an object of the present invention to provide highly reliable dielectric ceramic compositions and ceramic capacitors prepared by employing such dielectric ceramic compositions in forming dielectric layers thereof, wherein the dielectric ceramic compositions exhibit such electrical characteristics as a dielectric constant equal to or greater than 10,000, a capacitance variation of −80% to +30% (based on a capacitance obtained at a temperature of +25° C.) in the temperature range from −55° C. to +125° C., a dielectric loss "tan δ" of 10.0% or less and an accelerated life of 200,000 seconds or greater.

In accordance with a preferred embodiment of the present invention, there is provided a dielectric ceramic composition comprising: 100 mol part of an oxide of Ba, Ti and Zr, the content of the oxide of the Ba, Ti and Zr being calculated by assuming that the oxide thereof is $Ba(Ti_{1-x}Zr_x)O_3$; 0.25 to 1.5 mol part of an oxide of Re, Re representing one or more elements selected from the group consisting of Sm, Eu, Gd, Tb, Dy, Ho, Er, Tm, Yb and Y, the content of the oxide of the Re being calculated by assuming that the oxide thereof is $Re_2O_3$; 0.1 to 0.4 mol part of an oxide of Mg, the content of the oxide of the Mg being calculated by assuming that the oxide thereof is MgO; and 0.03 to 0.6 mol part of oxides of one or more elements selected from the group consisting of Mn, V and Cr, the contents of the oxides of the Mn, V and Cr being calculated by assuming that the oxides thereof are $Mn_2O_3$, $V_2O_5$ and $Cr_2O_3$, respectively, wherein a ratio of $Ba/(Ti_{1-x}Zr_x)$ ranges from about 1.000 to about 1.010 and x in $Ti_{1-x}Zr_x)$ ranges from about 0.05 to about 0.26.

BRIEF DESCRIPTION OF THE DRAWINGS

The above and other objects and features of the present invention will become apparent from the following description of a preferred embodiment given in conjunction with the accompanying drawing:

Drawing represents a schematic cross sectional view illustrating a multilayer ceramic capacitor.

DETAILED DESCRIPTION OF THE PREFERRED EMBODIMENTS

Compound powders of $BaTiO_3$, $ZrO_2$, $BaCO_3$, $Re_2O_3$, MgO, $MnO_2$, $V_2O_5$, $Cr_2O_3$, $Fe_2O_3$ and $WO_3$ were weighed in amounts as specified in the accompanying Tables 1-1 to 1-7 and mixed for about 20 hours by a wet method in a ball mill containing therein PSZ (partially sterilized zirconia) balls and water to thereby obtain a ceramic slurry. The produced ceramic slurry (containing 30% of water) was dehydrated and then dried by being heated at about 150° C. for 6 hours. It should be noted that "Re" is selected, e.g., from the group consisting of Sm, Eu, Gd, Tb, Dy, Ho, Er, Tm, Yb and Y.

TABLE 1

| Sample No. | Rare Earth ($Re_2O_3$) Element | Content | MgO | $Mn_2O_3$ | $V_2O_5$ | $Cr_2O_3$ | Total Content | $MoO_3$ | Ba | Ti | Zr | Ba/(TiZr) |
|---|---|---|---|---|---|---|---|---|---|---|---|---|
| 1-X | Ho | 0.75 | 0.2 | 0.02 | — | — | 0.02 | 0.05 | 100.3 | 86 | 14 | 1.003 |
| 2-X | Ho | 0.75 | 0.2 | — | 0.02 | — | 0.02 | 0.05 | 100.3 | 86 | 14 | 1.003 |
| 3-X | Ho | 0.75 | 0.2 | — | — | 0.02 | 0.02 | 0.05 | 100.3 | 86 | 14 | 1.003 |
| 4 | Ho | 0.75 | 0.2 | 0.03 | — | — | 0.03 | 0.05 | 100.3 | 86 | 14 | 1.003 |
| 5 | Ho | 0.75 | 0.2 | — | 0.03 | — | 0.03 | 0.05 | 100.3 | 86 | 14 | 1.003 |
| 6 | Ho | 0.75 | 0.2 | — | — | 0.03 | 0.03 | 0.05 | 100.3 | 86 | 14 | 1.003 |
| 7 | Ho | 0.75 | 0.2 | 0.01 | 0.02 | — | 0.03 | 0.05 | 100.3 | 86 | 14 | 1.003 |
| 8 | Ho | 0.75 | 0.2 | 0.05 | 0.02 | — | 0.07 | 0.05 | 100.3 | 86 | 14 | 1.003 |
| 9 | Ho | 0.75 | 0.2 | 0.05 | — | 0.2 | 0.25 | 0.05 | 100.3 | 86 | 14 | 1.003 |
| 10 | Ho | 0.75 | 0.2 | 0.05 | 0.01 | 0.2 | 0.26 | 0.05 | 100.3 | 86 | 14 | 1.003 |
| 11 | Ho | 0.75 | 0.2 | 0.05 | 0.05 | 0.2 | 0.3 | 0.05 | 100.3 | 86 | 14 | 1.003 |
| 12 | Ho | 0.75 | 0.2 | 0.2 | 0.2 | 0.2 | 0.6 | 0.05 | 100.3 | 86 | 14 | 1.003 |
| 13 | Ho | 0.75 | 0.2 | 0.6 | — | — | 0.6 | 0.05 | 100.3 | 86 | 14 | 1.003 |
| 14 | Ho | 0.75 | 0.2 | — | 0.6 | — | 0.6 | 0.05 | 100.3 | 86 | 14 | 1.003 |
| 15 | Ho | 0.75 | 0.2 | — | — | 0.6 | 0.6 | 0.05 | 100.3 | 86 | 14 | 1.003 |

TABLE 1-continued

| Sample No. | Rare Earth Element | Rare Earth Content | MgO | Mn₂O₃ | V₂O₅ | Cr₂O₃ | Total Content | WO₃ | Ba | Ti | Zr | Ba/(TiZr) |
|---|---|---|---|---|---|---|---|---|---|---|---|---|
| 16X | Ho | 0.75 | 0.2 | 0.7 | — | — | 0.7 | 0.05 | 100.3 | 86 | 14 | 1.003 |
| 17X | Ho | 0.75 | 0.2 | — | 0.7 | — | 0.7 | 0.05 | 100.3 | 86 | 14 | 1.003 |
| 18X | Ho | 0.75 | 0.2 | — | — | 0.7 | 0.7 | 0.05 | 100.3 | 86 | 14 | 1.003 |
| 19X | Ho | 0.75 | 0.2 | 0.05 | 0.1 | 0.1 | 0.25 | 0 | 100.3 | 86 | 14 | 1.003 |
| 20 | Ho | 0.75 | 0.2 | 0.05 | 0.1 | 0.1 | 0.25 | 0.025 | 100.3 | 86 | 14 | 1.003 |
| 21 | Ho | 0.75 | 0.2 | 0.05 | 0.1 | 0.1 | 0.25 | 0.05 | 100.3 | 86 | 14 | 1.003 |
| 22 | Ho | 0.75 | 0.2 | 0.05 | 0.1 | 0.1 | 0.25 | 0.1 | 100.3 | 86 | 14 | 1.003 |
| 23 | Ho | 0.75 | 0.2 | 0.05 | 0.1 | 0.1 | 0.25 | 0.2 | 100.3 | 86 | 14 | 1.003 |
| 24 | Ho | 0.75 | 0.2 | 0.05 | 0.1 | 0.1 | 0.25 | 0.3 | 100.3 | 86 | 14 | 1.003 |
| 25X | Ho | 0.75 | 0.2 | 0.05 | 0.1 | 0.1 | 0.25 | 0.4 | 100.3 | 86 | 14 | 1.003 |
| 26 | Ho | 0.75 | 0.2 | 0.025 | 0.05 | 0.2 | 0.275 | 0.05 | 100.3 | 86 | 14 | 1.003 |
| 27X | Ho | 0.00 | 0.2 | 0.15 | 0.05 | 0.2 | 0.4 | 0.05 | 100.3 | 86 | 14 | 1.003 |
| 28 | Ho | 0.25 | 0.2 | 0.15 | 0.05 | 0.2 | 0.4 | 0.05 | 100.3 | 86 | 14 | 1.003 |
| 29 | Ho | 0.5 | 0.2 | 0.15 | 0.05 | 0.2 | 0.4 | 0.05 | 100.3 | 86 | 14 | 1.003 |
| 30 | Ho | 1.0 | 0.2 | 0.15 | 0.05 | 0.2 | 0.4 | 0.05 | 100.3 | 86 | 14 | 1.003 |
| 31 | Ho | 1.5 | 0.2 | 0.15 | 0.05 | 0.2 | 0.4 | 0.05 | 100.3 | 86 | 14 | 1.003 |
| 32X | Ho | 2.0 | 0.2 | 0.15 | 0.05 | 0.2 | 0.4 | 0.05 | 100.3 | 86 | 14 | 1.003 |
| 33X | Ho | 4.0 | 0.2 | 0.15 | 0.05 | 0.2 | 0.4 | 0.05 | 100.3 | 86 | 14 | 1.003 |
| 34 | Sm | 0.25 | 0.3 | 0.15 | 0.05 | 0.2 | 0.4 | 0.05 | 100.3 | 86 | 14 | 1.003 |
| 35 | Sm | 0.75 | 0.3 | 0.15 | 0.05 | 0.2 | 0.4 | 0.05 | 100.3 | 86 | 14 | 1.003 |
| 36 | Eu | 0.75 | 0.3 | 0.15 | 0.05 | 0.2 | 0.4 | 0.05 | 100.3 | 86 | 14 | 1.003 |
| 37 | Gd | 0.75 | 0.3 | 0.15 | 0.05 | 0.2 | 0.4 | 0.05 | 100.3 | 86 | 14 | 1.003 |
| 38 | Tb | 0.75 | 0.3 | 0.15 | 0.05 | 0.2 | 0.4 | 0.05 | 100.3 | 86 | 14 | 1.003 |
| 39 | Dy | 0.75 | 0.3 | 0.15 | 0.05 | 0.2 | 0.4 | 0.05 | 100.3 | 86 | 14 | 1.003 |
| 40 | Er | 0.75 | 0.1 | 0.15 | 0.05 | 0.2 | 0.4 | 0.05 | 100.3 | 86 | 14 | 1.003 |
| 41 | Tm | 0.75 | 0.1 | 0.15 | 0.05 | 0.2 | 0.4 | 0.05 | 100.3 | 86 | 14 | 1.003 |
| 42 | Yb | 0.75 | 0.1 | 0.15 | 0.05 | 0.2 | 0.4 | 0.05 | 100.3 | 86 | 14 | 1.003 |
| 43 | Yb | 1.0 | 0.1 | 0.15 | 0.05 | 0.2 | 0.4 | 0.05 | 100.3 | 86 | 14 | 1.003 |
| 44 | Y | 1.0 | 0.1 | 0.15 | 0.05 | 0.2 | 0.4 | 0.05 | 100.3 | 86 | 14 | 1.003 |
| 45 | Ho/Dy | 0.5/0.5 | 0.2 | 0.15 | 0.05 | 0.2 | 0.4 | 0.05 | 100.3 | 86 | 14 | 1.003 |
| 46 | Ho/Dy/Yb | 0.5/0.5/0.5 | 0.2 | 0.15 | 0.05 | 0.2 | 0.4 | 0.05 | 100.3 | 86 | 14 | 1.003 |
| 47 | Sm/Ho/Yb | 0.2/0.5/0.1 | 0.2 | 0.15 | 0.05 | 0.2 | 0.4 | 0.05 | 100.3 | 86 | 14 | 1.003 |
| 48 | Sm/Yb | 0.5/1.0 | 0.2 | 0.15 | 0.05 | 0.2 | 0.4 | 0.05 | 100.3 | 86 | 14 | 1.003 |
| 49X | Ho | 0.75 | 0 | 0.15 | 0.05 | 0.2 | 0.4 | 0.05 | 100.3 | 86 | 14 | 1.003 |
| 50 | Ho | 0.75 | 0.1 | 0.15 | 0.05 | 0.2 | 0.4 | 0.05 | 100.3 | 86 | 14 | 1.003 |
| 51 | Ho | 0.75 | 0.4 | 0.15 | 0.05 | 0.2 | 0.4 | 0.05 | 100.3 | 86 | 14 | 1.003 |
| 52X | Ho | 0.75 | 0.5 | 0.15 | 0.05 | 0.2 | 0.4 | 0.05 | 100.3 | 86 | 14 | 1.003 |
| 53X | Ho | 0.75 | 0.2 | 0.15 | 0.05 | 0.2 | 0.4 | 0.05 | 99.7 | 86 | 14 | 0.997 |
| 54 | Ho | 0.75 | 0.2 | 0.15 | 0.05 | 0.2 | 0.4 | 0.05 | 100.0 | 86 | 14 | 1.000 |
| 55 | Ho | 0.75 | 0.2 | 0.15 | 0.05 | 0.2 | 0.4 | 0.05 | 100.5 | 86 | 14 | 1.005 |
| 56 | Ho | 0.75 | 0.2 | 0.15 | 0.05 | 0.2 | 0.4 | 0.05 | 101.0 | 86 | 14 | 1.010 |
| 57X | Ho | 0.75 | 0.2 | 0.15 | 0.05 | 0.2 | 0.4 | 0.05 | 101.5 | 86 | 14 | 1.015 |
| 58X | Ho | 1.5 | 0.2 | 0.15 | 0.05 | 0.2 | 0.4 | 0.05 | 100.5 | 100 | 0 | 1.005 |
| 59 | Ho | 1.5 | 0.2 | 0.15 | 0.05 | 0.2 | 0.4 | 0.05 | 100.5 | 95 | 5 | 1.005 |
| 60 | Ho | 1.5 | 0.2 | 0.15 | 0.05 | 0.2 | 0.4 | 0.05 | 100.5 | 80 | 20 | 1.005 |
| 61 | Ho | 1.5 | 0.2 | 0.15 | 0.05 | 0.2 | 0.4 | 0.05 | 100.5 | 74 | 26 | 1.005 |
| 62X | Ho | 1.5 | 0.2 | 0.15 | 0.05 | 0.2 | 0.4 | 0.05 | 100.5 | 70 | 30 | 1.005 |
| 63X | Ho | 0.75 | 0.2 | 0.02 | — | — | 0.02 | 0.05 | 100.3 | 86 | 14 | 1.003 |
| 64X | Ho | 0.75 | 0.2 | — | 0.02 | — | 0.02 | 0.05 | 100.3 | 86 | 14 | 1.003 |
| 65X | Ho | 0.75 | 0.2 | — | — | 0.02 | 0.02 | 0.05 | 100.3 | 86 | 14 | 1.003 |
| 66 | Ho | 0.75 | 0.2 | 0.03 | — | — | 0.03 | 0.05 | 100.3 | 86 | 14 | 1.003 |
| 67 | Ho | 0.75 | 0.2 | — | 0.03 | — | 0.03 | 0.05 | 100.3 | 86 | 14 | 1.003 |
| 68 | Ho | 0.75 | 0.2 | — | — | 0.03 | 0.03 | 0.05 | 100.3 | 86 | 14 | 1.003 |
| 69 | Ho | 0.75 | 0.2 | 0.01 | 0.02 | — | 0.03 | 0.05 | 100.3 | 86 | 14 | 1.003 |
| 70 | Ho | 0.75 | 0.2 | 0.05 | 0.02 | — | 0.07 | 0.05 | 100.3 | 86 | 14 | 1.003 |
| 71 | Ho | 0.75 | 0.2 | 0.05 | — | 0.2 | 0.25 | 0.05 | 100.3 | 86 | 14 | 1.003 |
| 72 | Ho | 0.75 | 0.2 | 0.05 | 0.01 | 0.2 | 0.26 | 0.05 | 100.3 | 86 | 14 | 1.003 |
| 73 | Ho | 0.75 | 0.2 | 0.05 | 0.05 | 0.2 | 0.3 | 0.05 | 100.3 | 86 | 14 | 1.003 |
| 74 | Ho | 0.75 | 0.2 | 0.2 | 0.2 | 0.2 | 0.6 | 0.05 | 100.3 | 86 | 14 | 1.003 |
| 75 | Ho | 0.75 | 0.2 | 0.6 | — | — | 0.6 | 0.05 | 100.3 | 86 | 14 | 1.003 |
| 76 | Ho | 0.75 | 0.2 | — | 0.6 | — | 0.6 | 0.05 | 100.3 | 86 | 14 | 1.003 |
| 77 | Ho | 0.75 | 0.2 | — | — | 0.6 | 0.6 | 0.05 | 100.3 | 86 | 14 | 1.003 |
| 78X | Ho | 0.75 | 0.2 | 0.7 | — | — | 0.7 | 0.05 | 100.3 | 86 | 14 | 1.003 |
| 79X | Ho | 0.75 | 0.2 | — | 0.7 | — | 0.7 | 0.05 | 100.3 | 86 | 14 | 1.003 |
| 80X | Ho | 0.75 | 0.2 | — | — | 0.7 | 0.7 | 0.05 | 100.3 | 86 | 14 | 1.003 |

TABLE 1-continued

| Sample No. | Element | Content | MgO | Mn₂O₃ | V₂O₅ | Cr₂O₃ | Total Content | MoO₃ | Ba | Ti | Zr | Ba/(TiZr) |
|---|---|---|---|---|---|---|---|---|---|---|---|---|
| 81※ | Ho | 0.75 | 0.2 | 0.05 | 0.1 | 0.1 | 0.25 | 0 | 100.3 | 86 | 14 | 1.003 |
| 82 | Ho | 0.75 | 0.2 | 0.05 | 0.1 | 0.1 | 0.25 | 0.025 | 100.3 | 86 | 14 | 1.003 |
| 83 | Ho | 0.75 | 0.2 | 0.05 | 0.1 | 0.1 | 0.25 | 0.05 | 100.3 | 86 | 14 | 1.003 |
| 84 | Ho | 0.75 | 0.2 | 0.05 | 0.1 | 0.1 | 0.25 | 0.1 | 100.3 | 86 | 14 | 1.003 |
| 85 | Ho | 0.75 | 0.2 | 0.05 | 0.1 | 0.1 | 0.25 | 0.2 | 100.3 | 86 | 14 | 1.003 |
| 86 | Ho | 0.75 | 0.2 | 0.05 | 0.1 | 0.1 | 0.25 | 0.3 | 100.3 | 86 | 14 | 1.003 |
| 87※ | Ho | 0.75 | 0.2 | 0.05 | 0.1 | 0.1 | 0.25 | 0.4 | 100.3 | 86 | 14 | 1.003 |
| 88 | Ho | 0.75 | 0.2 | 0.025 | 0.05 | 0.2 | 0.275 | 0.05 | 100.3 | 86 | 14 | 1.003 |
| 89※ | Ho | 0.00 | 0.2 | 0.15 | 0.05 | 0.2 | 0.4 | 0.05 | 100.3 | 86 | 14 | 1.003 |
| 90 | Ho | 0.25 | 0.2 | 0.15 | 0.05 | 0.2 | 0.4 | 0.05 | 100.3 | 86 | 14 | 1.003 |
| 91 | Ho | 0.5 | 0.2 | 0.15 | 0.05 | 0.2 | 0.4 | 0.05 | 100.3 | 86 | 14 | 1.003 |

| Sample No. | Rare Earth (Re₂O₃) Element | Content | Dielectric Composition (mol %) MgO | Mn₂O₃ | V₂O₅ | Cr₂O₃ | Total Content | MoO₃ | Ba | Ti | Zr | Ba/(TiZr) |
|---|---|---|---|---|---|---|---|---|---|---|---|---|
| 92 | Ho | 1.0 | 0.2 | 0.15 | 0.05 | 0.2 | 0.4 | 0.05 | 100.3 | 86 | 14 | 1.003 |
| 93 | Ho | 1.5 | 0.2 | 0.15 | 0.05 | 0.2 | 0.4 | 0.05 | 100.3 | 86 | 14 | 1.003 |
| 94※ | Ho | 2.0 | 0.2 | 0.15 | 0.05 | 0.2 | 0.4 | 0.05 | 100.3 | 86 | 14 | 1.003 |
| 95※ | Ho | 4.0 | 0.2 | 0.15 | 0.05 | 0.2 | 0.4 | 0.05 | 100.3 | 86 | 14 | 1.003 |
| 96 | Sm | 0.25 | 0.3 | 0.15 | 0.05 | 0.2 | 0.4 | 0.05 | 100.3 | 86 | 14 | 1.003 |
| 97 | Sm | 0.75 | 0.3 | 0.15 | 0.05 | 0.2 | 0.4 | 0.05 | 100.3 | 86 | 14 | 1.003 |
| 98 | Eu | 0.75 | 0.3 | 0.15 | 0.05 | 0.2 | 0.4 | 0.05 | 100.3 | 86 | 14 | 1.003 |
| 99 | Gd | 0.75 | 0.2 | 0.15 | 0.05 | 0.2 | 0.4 | 0.05 | 100.3 | 86 | 14 | 1.003 |
| 100 | Tb | 0.75 | 0.2 | 0.15 | 0.05 | 0.2 | 0.4 | 0.05 | 100.3 | 86 | 14 | 1.003 |
| 101 | Dy | 0.75 | 0.3 | 0.15 | 0.05 | 0.2 | 0.4 | 0.05 | 100.3 | 86 | 14 | 1.003 |
| 102 | Er | 0.75 | 0.25 | 0.15 | 0.05 | 0.2 | 0.4 | 0.05 | 100.3 | 86 | 14 | 1.003 |
| 103 | Tm | 0.75 | 0.25 | 0.15 | 0.05 | 0.2 | 0.4 | 0.05 | 100.3 | 86 | 14 | 1.003 |
| 104 | Yb | 0.75 | 0.25 | 0.15 | 0.05 | 0.2 | 0.4 | 0.05 | 100.3 | 86 | 14 | 1.003 |
| 105 | Yb | 1.0 | 0.25 | 0.15 | 0.05 | 0.2 | 0.4 | 0.05 | 100.3 | 86 | 14 | 1.003 |
| 106 | Y | 1.0 | 0.25 | 0.15 | 0.05 | 0.2 | 0.4 | 0.05 | 100.3 | 86 | 14 | 1.003 |
| 107 | Ho/Dy | 0.5/0.5 | 0.2 | 0.15 | 0.05 | 0.2 | 0.4 | 0.05 | 100.3 | 86 | 14 | 1.003 |
| 108 | Ho/Dy/Yb | 0.5/0.5/0.5 | 0.2 | 0.15 | 0.05 | 0.2 | 0.4 | 0.05 | 100.3 | 86 | 14 | 1.003 |
| 109 | Sm/Ho/Yb | 0.2/0.5/0.1 | 0.2 | 0.15 | 0.05 | 0.2 | 0.4 | 0.05 | 100.3 | 86 | 14 | 1.003 |
| 110 | Sm/Yb | 0.5/1.0 | 0.2 | 0.15 | 0.05 | 0.2 | 0.4 | 0.05 | 100.3 | 86 | 14 | 1.003 |
| 111※ | Ho | 0.75 | 0 | 0.15 | 0.05 | 0.2 | 0.4 | 0.05 | 100.3 | 86 | 14 | 1.003 |
| 112 | Ho | 0.75 | 0.1 | 0.15 | 0.05 | 0.2 | 0.4 | 0.05 | 100.3 | 86 | 14 | 1.003 |
| 113 | Ho | 0.75 | 0.4 | 0.15 | 0.05 | 0.2 | 0.4 | 0.05 | 100.3 | 86 | 14 | 1.003 |
| 114※ | Ho | 0.75 | 0.5 | 0.15 | 0.05 | 0.2 | 0.4 | 0.05 | 100.3 | 86 | 14 | 1.003 |
| 115※ | Ho | 0.75 | 0.2 | 0.15 | 0.05 | 0.2 | 0.4 | 0.05 | 99.7 | 86 | 14 | 0.997 |
| 116 | Ho | 0.75 | 0.2 | 0.15 | 0.05 | 0.2 | 0.4 | 0.05 | 100.0 | 86 | 14 | 1.000 |
| 117 | Ho | 0.75 | 0.2 | 0.15 | 0.05 | 0.2 | 0.4 | 0.05 | 100.5 | 86 | 14 | 1.007 |
| 118 | Ho | 0.75 | 0.2 | 0.15 | 0.05 | 0.2 | 0.4 | 0.05 | 101.0 | 86 | 14 | 1.010 |
| 119※ | Ho | 0.75 | 0.2 | 0.15 | 0.05 | 0.2 | 0.4 | 0.05 | 101.5 | 86 | 14 | 1.015 |
| 120※ | Ho | 1.5 | 0.2 | 0.15 | 0.05 | 0.2 | 0.4 | 0.05 | 100.5 | 100 | 0 | 1.005 |
| 121 | Ho | 1.5 | 0.2 | 0.15 | 0.05 | 0.2 | 0.4 | 0.05 | 100.5 | 95 | 5 | 1.005 |
| 122 | Ho | 1.5 | 0.2 | 0.15 | 0.05 | 0.2 | 0.4 | 0.05 | 100.5 | 80 | 20 | 1.005 |
| 123 | Ho | 1.5 | 0.2 | 0.15 | 0.05 | 0.2 | 0.4 | 0.05 | 100.5 | 74 | 26 | 1.005 |
| 124※ | Ho | 1.5 | 0.2 | 0.15 | 0.05 | 0.2 | 0.4 | 0.05 | 100.5 | 70 | 30 | 1.005 |

| Sample No. | Rare Earth (Re₂O₃) Element | Content | Dielectric Composition (mol %) MgO | Mn₂O₃ | V₂O₅ | Cr₂O₃ | Total Content | Addition amounts (MoO₃ + WO₃) | Ba | Ti | Zr | Ba/(TiZr) |
|---|---|---|---|---|---|---|---|---|---|---|---|---|
| 125※ | Ho | 0.75 | 0.2 | 0.02 | — | — | 0.02 | 0.025 + 0.03 | 100.3 | 86 | 14 | 1.003 |
| 126※ | Ho | 0.75 | 0.2 | — | 0.02 | — | 0.02 | 0.025 + 0.03 | 100.3 | 86 | 14 | 1.003 |
| 127※ | Ho | 0.75 | 0.2 | — | — | 0.02 | 0.02 | 0.025 + 0.03 | 100.3 | 86 | 14 | 1.003 |
| 128 | Ho | 0.75 | 0.2 | 0.03 | — | — | 0.03 | 0.025 + 0.03 | 100.3 | 86 | 14 | 1.003 |
| 129 | Ho | 0.75 | 0.2 | — | 0.03 | — | 0.03 | 0.025 + 0.03 | 100.3 | 86 | 14 | 1.003 |
| 130 | Ho | 0.75 | 0.2 | — | — | 0.03 | 0.03 | 0.025 + 0.03 | 100.3 | 86 | 14 | 1.003 |

TABLE 1-continued

| | | | | | | | | | | | |
|---|---|---|---|---|---|---|---|---|---|---|---|
| 131 | Ho | 0.75 | 0.2 | 0.01 | 0.02 | — | 0.03 | 0.025 + 0.03 | 100.3 | 86 | 14 | 1.003 |
| 132 | Ho | 0.75 | 0.2 | 0.05 | 0.02 | — | 0.07 | 0.025 + 0.03 | 100.3 | 86 | 14 | 1.003 |
| 133 | Ho | 0.75 | 0.2 | 0.05 | — | 0.2 | 0.25 | 0.025 + 0.03 | 100.3 | 86 | 14 | 1.003 |
| 134 | Ho | 0.75 | 0.2 | 0.05 | 0.01 | 0.2 | 0.26 | 0.025 + 0.03 | 100.3 | 86 | 14 | 1.003 |
| 135 | Ho | 0.75 | 0.2 | 0.05 | 0.05 | 0.2 | 0.3 | 0.025 + 0.03 | 100.3 | 86 | 14 | 1.003 |
| 136 | Ho | 0.75 | 0.2 | 0.2 | 0.2 | 0.2 | 0.6 | 0.025 + 0.03 | 100.3 | 86 | 14 | 1.003 |
| 137 | Ho | 0.75 | 0.2 | 0.6 | — | — | 0.6 | 0.025 + 0.03 | 100.3 | 86 | 14 | 1.003 |
| 138 | Ho | 0.75 | 0.2 | — | 0.6 | — | 0.6 | 0.025 + 0.03 | 100.3 | 86 | 14 | 1.003 |
| 139 | Ho | 0.75 | 0.2 | — | — | 0.6 | 0.6 | 0.025 + 0.03 | 100.3 | 86 | 14 | 1.003 |
| 140✗ | Ho | 0.75 | 0.2 | 0.7 | — | — | 0.7 | 0.025 + 0.03 | 100.3 | 86 | 14 | 1.003 |
| 141✗ | Ho | 0.75 | 0.2 | — | 0.7 | — | 0.7 | 0.025 + 0.03 | 100.3 | 86 | 14 | 1.003 |
| 142✗ | Ho | 0.75 | 0.2 | — | — | 0.7 | 0.7 | 0.025 + 0.03 | 100.3 | 86 | 14 | 1.003 |
| 143✗ | Ho | 0.75 | 0.2 | 0.05 | 0.1 | 0.1 | 0.25 | 0 | 100.3 | 86 | 14 | 1.003 |
| 144 | Ho | 0.75 | 0.2 | 0.05 | 0.1 | 0.1 | 0.25 | 0.013 + 0.01 | 100.3 | 86 | 14 | 1.003 |
| 145 | Ho | 0.75 | 0.2 | 0.05 | 0.1 | 0.1 | 0.25 | 0.025 + 0.03 | 100.3 | 86 | 14 | 1.003 |
| 146 | Ho | 0.75 | 0.2 | 0.05 | 0.1 | 0.1 | 0.25 | 0.025 + 0.05 | 100.3 | 86 | 14 | 1.003 |
| 147 | Ho | 0.75 | 0.2 | 0.05 | 0.1 | 0.1 | 0.25 | 0.1 + 0.1 | 100.3 | 86 | 14 | 1.003 |
| 148 | Ho | 0.75 | 0.2 | 0.05 | 0.1 | 0.1 | 0.25 | 0.15 + 0.15 | 100.3 | 86 | 14 | 1.003 |
| 149✗ | Ho | 0.75 | 0.2 | 0.05 | 0.1 | 0.1 | 0.25 | 0.2 + 0.2 | 100.3 | 86 | 14 | 1.003 |
| 150 | Ho | 0.75 | 0.2 | 0.025 | 0.05 | 0.2 | 0.275 | 0.025 + 0.03 | 100.3 | 86 | 14 | 1.003 |
| 151✗ | Ho | 0.00 | 0.2 | 0.15 | 0.05 | 0.2 | 0.4 | 0.025 + 0.03 | 100.3 | 86 | 14 | 1.003 |
| 152 | Ho | 0.25 | 0.2 | 0.15 | 0.05 | 0.2 | 0.4 | 0.025 + 0.03 | 100.3 | 86 | 14 | 1.003 |
| 153 | Ho | 0.5 | 0.2 | 0.15 | 0.05 | 0.2 | 0.4 | 0.025 + 0.03 | 100.3 | 86 | 14 | 1.003 |
| 154 | Ho | 1.0 | 0.2 | 0.15 | 0.05 | 0.2 | 0.4 | 0.025 + 0.03 | 100.3 | 86 | 14 | 1.003 |
| 155 | Ho | 1.5 | 0.2 | 0.15 | 0.05 | 0.2 | 0.4 | 0.025 + 0.025 | 100.3 | 86 | 14 | 1.003 |
| 156✗ | Ho | 2.0 | 0.2 | 0.15 | 0.05 | 0.2 | 0.4 | 0.025 + 0.025 | 100.3 | 86 | 14 | 1.003 |
| 157✗ | Ho | 4.0 | 0.2 | 0.15 | 0.05 | 0.2 | 0.4 | 0.025 + 0.025 | 100.3 | 86 | 14 | 1.003 |
| 158 | Sm | 0.25 | 0.3 | 0.15 | 0.05 | 0.2 | 0.4 | 0.025 + 0.025 | 100.3 | 86 | 14 | 1.003 |
| 159 | Sm | 0.75 | 0.3 | 0.15 | 0.05 | 0.2 | 0.4 | 0.025 + 0.025 | 100.3 | 86 | 14 | 1.003 |
| 160 | Eu | 0.75 | 0.3 | 0.15 | 0.05 | 0.2 | 0.4 | 0.025 + 0.025 | 100.3 | 86 | 14 | 1.003 |
| 161 | Gd | 0.75 | 0.3 | 0.15 | 0.05 | 0.2 | 0.4 | 0.025 + 0.025 | 100.3 | 86 | 14 | 1.003 |
| 162 | Tb | 0.75 | 0.3 | 0.15 | 0.05 | 0.2 | 0.4 | 0.025 + 0.025 | 100.3 | 86 | 14 | 1.003 |
| 163 | Dy | 0.75 | 0.3 | 0.15 | 0.05 | 0.2 | 0.4 | 0.025 + 0.025 | 100.3 | 86 | 14 | 1.003 |
| 164 | Er | 0.75 | 0.1 | 0.15 | 0.05 | 0.2 | 0.4 | 0.025 + 0.025 | 100.3 | 86 | 14 | 1.003 |
| 165 | Tm | 0.75 | 0.1 | 0.15 | 0.05 | 0.2 | 0.4 | 0.025 + 0.025 | 100.3 | 86 | 14 | 1.003 |
| 166 | Yb | 0.75 | 0.1 | 0.15 | 0.05 | 0.2 | 0.4 | 0.025 + 0.025 | 100.3 | 86 | 14 | 1.003 |
| 167 | Yb | 1.0 | 0.1 | 0.15 | 0.05 | 0.2 | 0.4 | 0.025 + 0.025 | 100.3 | 86 | 14 | 1.003 |
| 168 | Y | 1.0 | 0.1 | 0.15 | 0.05 | 0.2 | 0.4 | 0.025 + 0.025 | 100.3 | 86 | 14 | 1.003 |
| 169 | Ho/Dy | 0.5/0.5 | 0.2 | 0.15 | 0.05 | 0.2 | 0.4 | 0.025 + 0.025 | | | | |

TABLE 1-continued

| | | | | | | | | | | | |
|---|---|---|---|---|---|---|---|---|---|---|---|
| 170 | Ho/<br>Dy/<br>Yb | 0.5/<br>0.5/<br>0.5 | 0.2 | 0.15 | 0.05 | 0.2 | 0.4 | 0.025 +<br>0.025 | 100.3 | 86 | 14 | 1.003 |
| 171 | Sm/<br>Ho/<br>Yb | 0.2/<br>0.5/<br>0.1 | 0.2 | 0.15 | 0.05 | 0.2 | 0.4 | 0.025 +<br>0.025 | 100.3 | 86 | 14 | 1.003 |
| 172 | Sm/<br>Yb | 0.5/<br>1.0 | 0.2 | 0.15 | 0.05 | 0.2 | 0.4 | 0.025 +<br>0.025 | 100.3 | 86 | 14 | 1.003 |
| 173✕ | Ho | 0.75 | 0 | 0.15 | 0.05 | 0.2 | 0.4 | 0.025 +<br>0.025 | 100.3 | 86 | 14 | 1.003 |
| 174 | Ho | 0.75 | 0.1 | 0.15 | 0.05 | 0.2 | 0.4 | 0.025 +<br>0.025 | 100.3 | 86 | 14 | 1.003 |
| 175 | Ho | 0.75 | 0.4 | 0.15 | 0.05 | 0.2 | 0.4 | 0.025 +<br>0.025 | 100.3 | 86 | 14 | 1.003 |
| 176✕ | Ho | 0.75 | 0.5 | 0.15 | 0.05 | 0.2 | 0.4 | 0.025 +<br>0.025 | 100.3 | 86 | 14 | 1.003 |
| 177✕ | Ho | 0.75 | 0.2 | 0.15 | 0.05 | 0.2 | 0.4 | 0.025 +<br>0.025 | 99.7 | 86 | 14 | 0.997 |
| 178 | Ho | 0.75 | 0.2 | 0.15 | 0.05 | 0.2 | 0.4 | 0.025 +<br>0.025 | 100.0 | 86 | 14 | 1.000 |
| 179 | Ho | 0.75 | 0.2 | 0.15 | 0.05 | 0.2 | 0.4 | 0.025 +<br>0.025 | 100.5 | 86 | 14 | 1.005 |
| 180 | Ho | 0.75 | 0.2 | 0.15 | 0.05 | 0.2 | 0.4 | 0.025 +<br>0.025 | 101.0 | 86 | 14 | 1.010 |
| 181✕ | Ho | 0.75 | 0.2 | 0.15 | 0.05 | 0.2 | 0.4 | 0.025 +<br>0.025 | 101.5 | 86 | 14 | 1.015 |
| 182✕ | Ho | 1.5 | 0.2 | 0.15 | 0.05 | 0.2 | 0.4 | 0.025 +<br>0.025 | 100.5 | 100 | 0 | 1.005 |
| 183 | Ho | 1.5 | 0.2 | 0.15 | 0.05 | 0.2 | 0.4 | 0.025 +<br>0.025 | 100.5 | 95 | 5 | 1.005 |
| 184 | Ho | 1.5 | 0.2 | 0.15 | 0.05 | 0.2 | 0.4 | 0.025 +<br>0.025 | 100.5 | 80 | 20 | 1.005 |
| 185 | Ho | 1.5 | 0.2 | 0.15 | 0.05 | 0.2 | 0.4 | 0.025 +<br>0.025 | 100.5 | 74 | 26 | 1.005 |
| 186✕ | Ho | 1.5 | 0.2 | 0.15 | 0.05 | 0.2 | 0.4 | 0.025 +<br>0.025 | 100.5 | 70 | 30 | 1.005 |

Thereafter, the dried ceramic slurry was ground and then calcined in air at about 800° C. for 6 hours. The calcined slurry was then crushed by employing a wet method in a ball mill added with ethanol for about 6 hours. Next, the crushed ceramic slurry was dried by being heated at about 150° C. for 6 hours, thereby obtaining the powder of the calcined ceramic slurry.

In a following step, a dielectric ceramic slurry was obtained by mixing and grinding 1000 g (100 parts by weight) of the powder of the dielectric ceramic slurry, 15 wt % of an organic binder and 50 wt % of water in a ball mill, wherein the organic binder includes acrylic ester polymer, glycerin, and a solution of condensed phosphate.

Next, the dielectric slurry was subjected to a vacuum air separator to remove air bubbles therefrom and formed into a thin film coated on a polyester film by using a reverse roll coater. Thus produced ceramic thin film on the polyester film was heated and dried at about 100° C. and then diced to thereby obtain square ceramic green sheets having a thickness of about 5 µm and a size of about 10 cm×10 cm.

Meanwhile, 0.9 g of ethyl cellulose dissolved in 9.1 g of butyl carbitol and 10 g of Nickel powder having an average diameter of about 0.5 µm were loaded and stirred in a stirrer for 10 hours to form a conductive paste for use in forming internal electrodes of ceramic capacitors. Thereafter, the conductive paste was printed on the prepared ceramic green sheets to form conductive patterns thereon and then the printed conductive paste was dried.

Subsequently, ten ceramic green sheets having the conductive patterns thereon were stacked against each other with the conductive patterns facing upward, thereby forming a laminated body. Every two neighboring sheets were disposed in such a manner that the conductive patterns provided thereon were shifted by one half of a pattern size along the length direction. The laminated body also included one or more ceramic dummy sheets stacked against each of the uppermost and the lowermost ceramic green sheets having conductive patterns thereon, the ceramic dummy sheets representing ceramic green sheets without having conductive patterns thereon.

Next, the laminated body was pressed with a load of about 40 tons at about 50° C. along the stacking direction of the ceramic sheets in the laminated body. Afterwards, the pressed laminated body was diced into a multiplicity of chip shaped ceramic bodies having a size of about 3.2 mm×1.6 mm.

Thereafter, Ni external electrodes were formed at two opposite sides of each chip shaped ceramic body by, e.g., a dipping method, one end portion of each of the internal electrodes being exposed to one of the two opposite sides of each chip shaped ceramic body. Then, the chip shaped ceramic bodies were loaded into a furnace capable of controlling an atmosphere therein and the organic binder contained in the loaded ceramic bodies was removed by heating the furnace in an $N_2$ atmosphere. Then, the binder-removed chip shaped ceramic bodies were sintered at about 1200° C. in a non-oxidative atmosphere with oxygen partial pressure being in $10^{-5}$ to $10^{-8}$ atm order range. Thereafter, the sintered chip-shaped ceramic bodies were re-oxidized in an oxidative atmosphere to thereby obtain multilayer ceramic capacitors as shown in the Drawing, wherein reference numerals 10, 12 and 14 in the Drawing represent dielectric layers, internal electrodes and external electrodes, respectively.

Tables 2-1 to 2-6 exhibit a measurement result of electrical characteristics obtained from the thus produced multilayer ceramic capacitors, wherein a thickness of each dielectric layer incorporated in the capacitors was about 3 μm.

The electrical characteristics of the multilayer ceramic capacitors were obtained as follows.

(A) Relative permittivity or dielectric constant $\epsilon_s$ was computed based on a facing area of a pair of neighboring internal electrodes, a thickness of a dielectric layer positioned between the pair of neighboring internal electrodes, and the capacitance of a multilayer ceramic capacitor obtained under the condition of applying at 20° C. a voltage of 1.0 V (root mean square value) with a frequency of 1 kHz.

(B) Dielectric loss tan δ(%) was obtained under the same condition as established for measuring the permittivity cited above.

(C) resistivity (Ωcm) was acquired by measuring a resistance between a pair of external electrodes after DC 25 V was applied for 60 seconds at 20° C. The number following "E" in the notation of a resistivity value presented in the accompanying Tables 2-1 to 2-6 represents an order. For instance, 4.8E +12 represents $4.8 \times 10^{12}$.

(D) Accelerated life (second) was obtained by measuring time period until an insulation resistivity (ρ) becomes $1 \times 10^{10}$ Ωcm in a DC electric field of 20 V/μm at 150° C.

(E) Capacitance variation $\Delta C/C_{25}$ (%) was obtained by measuring capacitances at −55° C. and +125° C. in a thermostatic (or constant temperature) oven under the condition of applying a voltage of 1 V (rms value) with a frequency of 1 kHz, wherein $C_{25}$ represents a capacitance at 25 C. and ΔC represents the difference between $C_{25}$ and a capacitance measured at −55° C. or 125° C.

TABLE 2

| Sample Number | Sintering Temperature (° C.) | Permittivity | Tan δ (%) | Resistivity (Ω cm) at Room Temperature | Capacitance Variation $\Delta c/c_{25}$ (%) −55° C. | 85° C. | Accelerated Life (sec) |
|---|---|---|---|---|---|---|---|
| 1·X· | 1200 | 17900 | 10.0 | 5.7E+12 | −60 | −70 | 112000 |
| 2·X· | 1200 | 18100 | 9.8 | 6.4E+12 | −56 | −71 | 149000 |
| 3·X· | 1200 | 17800 | 9.9 | 6.5E+12 | −55 | −68 | 98000 |
| 4 | 1200 | 17500 | 8.8 | 5.3E+12 | −55 | −71 | 220000 |
| 5 | 1200 | 17400 | 8.7 | 5.8E+12 | −50 | −70 | 231000 |
| 6 | 1200 | 17000 | 8.3 | 5.7E+12 | −50 | −70 | 241000 |
| 7 | 1200 | 15900 | 7.2 | 4.8E+12 | −48 | −72 | 270000 |
| 8 | 1200 | 14900 | 7.0 | 4.9E+12 | −45 | −71 | 269000 |
| 9 | 1200 | 15400 | 6.9 | 4.5E+12 | −47 | −71 | 277000 |
| 10 | 1200 | 12800 | 5.3 | 4.0E+12 | −42 | −72 | 302000 |
| 11 | 1200 | 13200 | 5.3 | 3.9E+12 | −44 | −73 | 318000 |
| 12 | 1200 | 13300 | 5.2 | 2.7E+12 | −41 | −73 | 322000 |
| 13 | 1200 | 11900 | 3.9 | 3.1E+12 | −40 | −74 | 358000 |
| 14 | 1200 | 10500 | 3.6 | 2.4E+12 | −41 | −75 | 389000 |
| 15 | 1200 | 11600 | 3.7 | 1.9E+12 | −40 | −74 | 379000 |
| 16·X· | 1200 | 9800 | 2.9 | 1.8E+12 | −35 | −76 | 514000 |
| 17·X· | 1200 | 9900 | 3.1 | 1.2E+12 | −36 | −78 | 530000 |
| 18·X· | 1200 | 9500 | 2.7 | 8.0E+11 | −34 | −77 | 548000 |
| 19·X· | 1200 | 15900 | 5.9 | 4.3E+12 | −44 | −71 | 158000 |
| 20 | 1200 | 16400 | 6.3 | 3.4E+12 | −43 | −71 | 218000 |
| 21 | 1200 | 16900 | 6.8 | 5.6E+12 | −47 | −72 | 275000 |
| 22 | 1200 | 17600 | 7.9 | 5.3E+12 | −50 | −74 | 318000 |
| 23 | 1200 | 18000 | 8.2 | 6.6E+12 | −49 | −75 | 329000 |
| 24 | 1200 | 18300 | 8.5 | 4.7E+12 | −52 | −76 | 376000 |
| 25·X· | 1200 | 1880 | 10.7 | 7.2E+12 | −55 | −81 | 479000 |
| 26 | 1200 | 14800 | 5.8 | 5.7E+12 | −48 | −73 | 297000 |
| 27·X· | 1200 | 18200 | 12.8 | 4.5E+12 | −60 | −68 | 157000 |
| 28 | 1200 | 17400 | 9.3 | 4.2E+12 | −56 | −70 | 218000 |

TABLE 2-continued

| Sample Number | Sintering Temperature (° C.) | Permittivity | Tan δ (%) | Resistivity (Ω cm) at Room Temperature | Capacitance Variation $\Delta c/c_{25}$ (%) −55° C. | 85° C. | Accelerated Life (sec) |
|---|---|---|---|---|---|---|---|
| 29 | 1200 | 16900 | 7.5 | 5.5E+12 | −54 | −72 | 238000 |
| 30 | 1200 | 14500 | 7.1 | 5.9E+12 | −53 | −72 | 364000 |
| 31 | 1200 | 12300 | 5.6 | 7.0E+12 | −47 | −73 | 497000 |
| 32·X· | 1200 | 9900 | 4.1 | 8.1E+12 | −44 | −74 | 663000 |
| 33·X· | 1200 | Incapable of obtaining a sintered ceramic with high density | | | | | |
| 34 | 1200 | 17300 | 9.8 | 6.1E+12 | −55 | −73 | 207000 |
| 35 | 1200 | 14500 | 7.3 | 5.5E+12 | −52 | −73 | 221000 |
| 36 | 1200 | 14800 | 7.8 | 7.8E+12 | −53 | −74 | 228000 |
| 37 | 1200 | 12900 | 8.9 | 5.9E+12 | −54 | −75 | 248000 |
| 38 | 1200 | 13300 | 8.2 | 1.7E+12 | −56 | −72 | 215000 |
| 39 | 1200 | 12800 | 7.9 | 3.2E+12 | −52 | −73 | 273000 |
| 40 | 1200 | 14400 | 6.2 | 7.2E+12 | −49 | −73 | 210000 |
| 41 | 1200 | 14900 | 9.5 | 8.5E+12 | −53 | −75 | 238000 |
| 42 | 1200 | 11400 | 8.7 | 4.3E+12 | −52 | −76 | 247000 |
| 43 | 1200 | 15700 | 7.5 | 5.9E+12 | −47 | −72 | 229000 |
| 44 | 1200 | 18200 | 7.7 | 7.7E+12 | −46 | −73 | 255000 |
| 45 | 1200 | 16500 | 8.3 | 4.9E+12 | −53 | −74 | 218000 |
| 46 | 1200 | 14300 | 7.0 | 8.6E+12 | −50 | −73 | 279000 |
| 47 | 1200 | 12900 | 7.7 | 4.3E+12 | −53 | −72 | 285000 |
| 48 | 1200 | 15300 | 8.2 | 3.3E+11 | −54 | −73 | 289000 |
| 49·X· | 1200 | 19700 | 10.5 | 6.0E+12 | −56 | −69 | 254000 |
| 50 | 1200 | 18800 | 8.7 | 6.4E+12 | −51 | −74 | 233000 |
| 51 | 1200 | 13700 | 5.6 | 4.3E+12 | −45 | −77 | 221000 |
| 52·X· | 1200 | 9800 | 3.2 | 8.4E+12 | −43 | −82 | 196000 |
| 53·X· | 1200 | Incapable of obtaining a sintered ceramic with high density | | | | | |
| 54 | 1200 | 11200 | 3.3 | 2.1E+12 | −42 | −73 | 418000 |
| 55 | 1200 | 14800 | 5.2 | 5.2E+12 | −44 | −72 | 348000 |
| 56 | 1200 | 17600 | 8.2 | 4.3E+12 | −50 | −70 | 221000 |
| 57·X· | 1200 | 19200 | 11.2 | 6.4E+12 | −55 | −67 | 63000 |
| 58·X· | 1200 | 9500 | 7.8 | 5.9E+12 | −52 | −71 | 327000 |
| 59 | 1200 | 11700 | 6.3 | 5.5E+12 | −46 | −73 | 346000 |
| 60 | 1200 | 14300 | 5.6 | 4.2E+12 | −44 | −75 | 374000 |
| 61 | 1200 | 12500 | 4.2 | 4.7E+12 | −43 | −73 | 412000 |
| 62·X· | 1200 | 9700 | 3.4 | 3.6E+12 | −41 | −71 | 447000 |
| 63·X· | 1200 | 17600 | 10.2 | 5.7E+12 | −59 | −71 | 132000 |
| 64·X· | 1200 | 18100 | 9.8 | 6.4E+12 | −58 | −72 | 134000 |
| 65·X· | 1200 | 17800 | 9.9 | 6.5E+12 | −56 | −76 | 127000 |
| 66 | 1200 | 17800 | 8.3 | 6.2E+12 | −54 | −73 | 213000 |
| 67 | 1200 | 17400 | 8.9 | 4.8E+12 | −50 | −72 | 221000 |
| 68 | 1200 | 17300 | 9.0 | 5.3E+12 | −52 | −72 | 209000 |
| 69 | 1200 | 15800 | 7.9 | 3.8E+12 | −47 | −73 | 296000 |
| 70 | 1200 | 15600 | 8.3 | 4.4E+12 | −45 | −72 | 285000 |
| 71 | 1200 | 14900 | 8.2 | 4.1E+12 | −48 | −73 | 281000 |
| 72 | 1200 | 12900 | 7.3 | 3.9E+12 | −43 | −75 | 329000 |
| 73 | 1200 | 13100 | 7.4 | 3.7E+12 | −43 | −72 | 354000 |
| 74 | 1200 | 13200 | 7.1 | 2.4E+12 | −42 | −75 | 312000 |
| 75 | 1200 | 10900 | 5.2 | 3.3E+12 | −44 | −73 | 489000 |
| 76 | 1200 | 11300 | 4.9 | 2.9E+12 | −42 | −74 | 463000 |
| 77 | 1200 | 10900 | 4.7 | 2.4E+12 | −41 | −73 | 475000 |
| 78·X· | 1200 | 9700 | 3.8 | 2.8E+12 | −36 | −75 | 558000 |
| 79·X· | 1200 | 9500 | 3.5 | 1.8E+12 | −37 | −74 | 512000 |
| 80·X· | 1200 | 9200 | 3.7 | 1.3E+12 | −35 | −73 | 568000 |
| 81·X· | 1200 | 14900 | 5.9 | 4.1E+12 | −45 | −72 | 164000 |
| 82 | 1200 | 16800 | 7.1 | 3.8E+12 | −44 | −69 | 238000 |
| 83 | 1200 | 17300 | 7.7 | 5.7E+12 | −48 | −75 | 218000 |
| 84 | 1200 | 17900 | 8.1 | 5.8E+12 | −50 | −74 | 241000 |
| 85 | 1200 | 18200 | 8.9 | 4.5E+12 | −49 | −72 | 318000 |
| 86 | 1200 | 18900 | 9.5 | 4.4E+12 | −52 | −76 | 367000 |
| 87·X· | 1200 | 19200 | 11.6 | 6.7E+12 | −55 | −81 | 428000 |
| 88 | 1200 | 14800 | 5.8 | 5.5E+12 | −44 | −72 | 295000 |
| 89·X· | 1200 | 18600 | 12.8 | 4.4E+12 | −57 | −69 | 168000 |
| 90 | 1200 | 18300 | 9.6 | 4.7E+12 | −53 | −71 | 206000 |
| 91 | 1200 | 17200 | 7.4 | 5.6E+12 | −51 | −71 | 226000 |
| 92 | 1200 | 16400 | 6.8 | 6.2E+12 | −54 | −75 | 263000 |
| 93 | 1200 | 13200 | 5.4 | 6.7E+12 | −49 | −72 | 437000 |
| 94·X· | 1200 | 9800 | 3.9 | 7.6E+12 | −43 | −73 | 554000 |
| 95·X· | 1200 | Incapable of obtaining a sintered ceramic with high density | | | | | |
| 96 | 1200 | 18700 | 8.9 | 3.1E+12 | −56 | −74 | 208000 |
| 97 | 1200 | 15000 | 7.6 | 5.3E+12 | −51 | −72 | 243000 |

TABLE 2-continued

| Sample Number | Sintering Temperature (°C.) | Permittivity | Tan δ (%) | Resistivity (Ω cm) at Room Temperature | Capacitance Variation Δc/c₂₅ (%) −55° C. | Capacitance Variation Δc/c₂₅ (%) 85° C. | Accelerated Life (sec) |
|---|---|---|---|---|---|---|---|
| 98 | 1200 | 14300 | 7.3 | 6.8E+12 | −54 | −75 | 243000 |
| 99 | 1200 | 13200 | 8.4 | 6.4E+12 | −51 | −73 | 222000 |
| 100 | 1200 | 12800 | 7.8 | 2.3E+12 | −50 | −75 | 273000 |
| 101 | 1200 | 12600 | 6.7 | 3.7E+12 | −51 | −71 | 264000 |
| 102 | 1200 | 14300 | 8.3 | 6.5E+12 | −57 | −73 | 243000 |
| 103 | 1200 | 13800 | 9.2 | 8.1E+12 | −58 | −71 | 245000 |
| 104 | 1200 | 12800 | 8.5 | 4.8E+12 | −56 | −73 | 231000 |
| 105 | 1200 | 14800 | 7.3 | 5.3E+12 | −46 | −75 | 251000 |
| 106 | 1200 | 16900 | 7.9 | 7.3E+12 | −44 | −74 | 233000 |
| 107 | 1200 | 15300 | 8.5 | 5.3E+12 | −54 | −78 | 239000 |
| 108 | 1200 | 14300 | 7.2 | 8.1E+11 | −49 | −78 | 242000 |
| 109 | 1200 | 12700 | 7.9 | 7.3E+12 | −48 | −74 | 264000 |
| 110 | 1200 | 14300 | 8.5 | 6.3E+12 | −56 | −74 | 274000 |
| 111·X· | 1200 | 18800 | 10.7 | 5.9E+12 | −62 | −67 | 278000 |
| 112 | 1200 | 17800 | 8.4 | 6.7E+12 | −58 | −70 | 229000 |
| 113 | 1200 | 14500 | 6.1 | 5.3E+12 | −47 | −77 | 253000 |
| 114·X· | 1200 | 8800 | 2.9 | 3.3E+12 | −35 | −84 | 201000 |
| 115·X· | 1200 | Incapable of obtaining a sintered ceramic with high density | | | | | |
| 116 | 1200 | 12300 | 3.4 | 2.3E+12 | −40 | −79 | 396000 |
| 117 | 1200 | 15200 | 5.6 | 5.7E+12 | −43 | −74 | 374000 |
| 118 | 1200 | 16300 | 8.1 | 4.7E+12 | −56 | −67 | 238000 |
| 119·X· | 1200 | 18300 | 12.1 | 2.4E+12 | −60 | −78 | 89000 |
| 120·X· | 1200 | 9400 | 7.3 | 5.6E+12 | −55 | −73 | 318000 |
| 121 | 1200 | 12500 | 6.7 | 6.6E+12 | −51 | −72 | 335000 |
| 122 | 1200 | 13200 | 6.1 | 6.2E+12 | −45 | −73 | 359000 |
| 123 | 1200 | 11800 | 4.7 | 7.3E+12 | −46 | −75 | 422000 |
| 124·X· | 1200 | 9800 | 3.7 | 6.3E+12 | −43 | −74 | 439000 |
| 125·X· | 1200 | 18300 | 11.0 | 7.8E+12 | −60 | −73 | 154000 |
| 126·X· | 1200 | 18000 | 10.2 | 5.4E+12 | −56 | −73 | 143000 |
| 127·X· | 1200 | 17900 | 9.9 | 6.2E+12 | −55 | −76 | 147000 |
| 128 | 1200 | 17300 | 8.9 | 7.3E+12 | −55 | −77 | 208000 |
| 129 | 1200 | 17200 | 9.3 | 6.3E+12 | −49 | −74 | 219000 |
| 130 | 1200 | 16900 | 9.2 | 2.3E+12 | −50 | −70 | 226000 |
| 131 | 1200 | 15400 | 8.2 | 3.9E+12 | −46 | −74 | 320000 |
| 132 | 1200 | 15500 | 8.4 | 4.3E+12 | −44 | −72 | 332000 |
| 133 | 1200 | 14700 | 8.1 | 2.1E+12 | −44 | −74 | 312000 |
| 134 | 1200 | 13200 | 7.5 | 4.2E+12 | −42 | −74 | 398000 |
| 135 | 1200 | 13400 | 7.4 | 8.7E+12 | −41 | −74 | 400000 |
| 136 | 1200 | 13200 | 7.2 | 5.4E+12 | −44 | −76 | 394000 |
| 137 | 1200 | 11500 | 6.0 | 4.2E+12 | −45 | −74 | 478000 |
| 138 | 1200 | 12300 | 5.8 | 3.2E+12 | −44 | −74 | 495000 |
| 139 | 1200 | 10000 | 4.6 | 2.9E+12 | −42 | −74 | 454000 |
| 140·X· | 1200 | 9400 | 4.2 | 5.8E+12 | −39 | −78 | 576000 |
| 141·X· | 1200 | 9300 | 3.5 | 4.7E+12 | −38 | −77 | 548000 |
| 142·X· | 1200 | 9100 | 3.9 | 4.3E+12 | −37 | −74 | 579000 |
| 143·X· | 1200 | 3600 | 5.4 | 4.9E+12 | −47 | −73 | 163900 |
| 144 | 1200 | 17300 | 6.7 | 5.8E+12 | −45 | −70 | 247000 |
| 145 | 1200 | 16800 | 7.4 | 7.2E+12 | −49 | −72 | 264000 |
| 146 | 1200 | 16900 | 7.7 | 6.6E+12 | −51 | −70 | 277000 |
| 147 | 1200 | 16700 | 8.3 | 8.3E+12 | −48 | −74 | 296000 |
| 148 | 1200 | 19900 | 8.9 | 8.8E+12 | −53 | −76 | 352000 |
| 149·X· | 1200 | 18700 | 10.9 | 9.1E+12 | −56 | −80 | 448000 |
| 150 | 1200 | 15500 | 6.3 | 6.5E+12 | −45 | −73 | 277000 |
| 151·X· | 1200 | 17500 | 12.9 | 4.7E+12 | −58 | −70 | 209000 |
| 152 | 1200 | 19200 | 9.2 | 4.6E+12 | −52 | −69 | 218000 |
| 153 | 1200 | 17700 | 7.8 | 5.2E+12 | −53 | −70 | 234000 |
| 154 | 1200 | 16600 | 6.4 | 6.3E+12 | −55 | −78 | 289000 |
| 155 | 1200 | 14400 | 5.5 | 5.8E+12 | −48 | −75 | 398000 |
| 156·X· | 1200 | 9500 | 3.5 | 7.0E+12 | −44 | −74 | 493000 |
| 157·X· | 1200 | Incapable of obtaining a sintered ceramic with high density | | | | | |
| 158 | 1200 | 18300 | 9.2 | 4.3E+12 | −55 | −73 | 212000 |
| 159 | 1200 | 15700 | 7.8 | 4.9E+12 | −50 | −70 | 231000 |
| 160 | 1200 | 15400 | 8.1 | 5.8E+12 | −53 | −74 | 253000 |
| 161 | 1200 | 13900 | 8.1 | 5.9E+12 | −52 | −75 | 247000 |
| 162 | 1200 | 13200 | 7.7 | 6.7E+12 | −51 | −73 | 254000 |
| 163 | 1200 | 12600 | 6.9 | 5.3E+12 | −49 | −74 | 253000 |
| 164 | 1200 | 14400 | 7.3 | 4.4E+12 | −58 | −75 | 243000 |
| 165 | 1200 | 13600 | 9.2 | 4.7E+12 | −60 | −70 | 251000 |
| 166 | 1200 | 12900 | 8.3 | 5.6E+12 | −58 | −71 | 249000 |
| 167 | 1200 | 14100 | 8.0 | 6.2E+12 | −47 | −74 | 244000 |
| 168 | 1200 | 15500 | 7.7 | 7.3E+12 | −43 | −72 | 212000 |
| 169 | 1200 | 14800 | 8.4 | 6.3E+12 | −55 | −75 | 246000 |
| 170 | 1200 | 14300 | 7.6 | 2.3E+12 | −50 | −76 | 247000 |
| 171 | 1200 | 13300 | 7.9 | 3.9E+12 | −47 | −76 | 252000 |
| 172 | 1200 | 14500 | 8.3 | 6.3E+11 | −56 | −74 | 263000 |
| 173·X· | 1200 | 18400 | 11.0 | 5.9E+12 | −60 | −70 | 269000 |
| 174 | 1200 | 17900 | 8.6 | 3.7E+12 | −59 | −69 | 237000 |
| 175 | 1200 | 14700 | 6.7 | 2.4E+12 | −48 | −76 | 246000 |
| 176·X· | 1200 | 8900 | 3.1 | 3.3E+12 | −40 | −82 | 196000 |
| 177·X· | 1200 | Incapable of obtaining a sintered ceramic with high density | | | | | |
| 178 | 1200 | 13100 | 3.3 | 2.9E+12 | −39 | −76 | 374000 |
| 179 | 1200 | 14800 | 5.9 | 2.4E+12 | −45 | −76 | 348000 |
| 180 | 1200 | 16600 | 8.8 | 4.1E+12 | −53 | −66 | 243000 |
| 181·X· | 1200 | 17900 | 11.5 | 3.3E+12 | −59 | −74 | 91000 |
| 182·X· | 1200 | 9300 | 8.8 | 2.3E+12 | −56 | −72 | 363000 |
| 183 | 1200 | 13200 | 8.2 | 5.2E+12 | −52 | −73 | 382000 |
| 184 | 1200 | 14600 | 7.5 | 3.9E+12 | −47 | −72 | 402000 |
| 185 | 1200 | 12200 | 6.4 | 5.8E+12 | −47 | −77 | 432000 |
| 186·X· | 1200 | 9000 | 4.9 | 5.9E+12 | −44 | −75 | 453000 |

As clearly seen from Tables 1-1 to 1-7 and Tables 2-1 to 2-6, multilayer ceramic capacitors with highly improved reliability having relative permittivity $\epsilon_s$ equal to or greater than 10,000, capacitance variation $\Delta C/C_{25}$ within the range from −80% to +30% at temperatures ranging from −55° C. to +125° C., tan δ of 10.0% or less and accelerated life of 200,000 seconds or greater could be obtained from the above samples sintered in a non-oxidative atmosphere even at a temperature of 1200° C. or lower in accordance with the present invention.

However, samples 1 to 3, 16 to 19, 25, 27, 32, 33, 49, 52, 53, 57, 58, 62 to 65, 78 to 87, 89, 94, 95, 111, 114, 115, 119, 120, 124 to 127, 140 to 143, 149, 151, 156, 157, 173, 176, 177, 181, 182, 186 (marked with "·X·" at the column of sample numbers in Tables) could not satisfy the above-specified electrical characteristics. Therefore, it appears that such samples fall outside a preferable compositional range of the present invention.

The reasons why the preferable compositional range for the dielectric ceramics in accordance with the present invention should be limited to certain values will now be described.

First, when the content of an oxide of a rare-earth element represented by Re is 0 mol part in terms of $Re_2O_3$ (i.e., assuming the oxide of Re is in the form of $Re_2O_3$) as in the samples 27, 89 and 151, the tan δ thereof goes over 10.0%; whereas when the oxide of Re is set to be 0.25 mol part in terms of $Re_2O_3$ as in samples 28, 90 and 152, the desired electrical characteristics can be successfully obtained.

Further, when the content of the oxide of the rare-earth element Re is 2.0 mol part in terms of $Re_2O_3$ as in samples 32, 94 and 156, the dielectric constant of the produced multilayer ceramic capacitors may become equal to or less than 10,000. However, when the content of the oxide of Re is set to be 1.5 mol part in terms of $Re_2O_3$ as in the samples 31, 93 and 155, the desired electrical characteristics can be successfully obtained.

Accordingly, the preferable range of the content of oxide of the rare-earth element Re is from 0.25 to 1.5 mol part in terms of $Re_2O_3$.

It is noted that same effects can be produced regardless of whether a single rare-earth element is used or two or more of rare-earth elements are used together as long as the above-described preferable content range of the rare-earth element Re is satisfied.

When the content of an oxide of Mg is 0 mol part in terms of MgO as in the samples 49, 111 and 173, the tan δ goes over 10.0%; whereas when the oxide of Mg is set to be 0.1 mol part in terms of MgO as in samples 50, 112 and 174, the desired electrical characteristics can be successfully obtained.

In addition, when the content of the oxide of Mg is 0.5 mol part in terms of MgO as in the samples 52, 114, 176, the relative permittivity of the produced multilayer ceramic capacitors may become equal to or less than 10,000 and the capacitance variation $\Delta C/C_{25}$ of the produced multilayer ceramic capacitors may deviate from the range from −80% to +30% when the temperature varies from −55° C. to +125° C.; and accordingly, the desired accelerated life cannot be obtained. However, when the content of the oxide of Mg is set to be 0.4 mol part in terms of MgO as in samples 51, 113 and 175, the desired electrical characteristics can be successfully obtained.

Accordingly, the content of the oxide of Mg desirably ranges from 0.1 to 0.4 mol part in terms of MgO.

When the content of an oxide of each element Mn, V or Cr is 0.02 mol part in terms of $Mn_2O_3$, $V_2O_5$ or $Cr_2O_3$, as in the samples 1 to 3, 63 to 65 and 125 to 127, the tan δ thereof goes over 10.0% or the desired accelerated life of the produced multilayer ceramic capacitors may not be obtained; whereas when the total content of the oxides of Mn, V and Cr is set to be 0.03 mol part in terms of $Mn_2O_3$, $V_2O_5$ and $Cr_2O_3$, as in the samples 4 to 7, 66 to 68 and 128 and 130, the desired characteristics can be successfully attained.

Further, when the content of an oxide of Mn, V or Cr is 0.7 mol part in terms of $Mn_2O_3$, $V_2O_5$ or $Cr_2O_3$, as in the samples 16 to 18, 78 to 80 and 140 and 142, the dielectric constant of the capacitors becomes equal to or less than 10,000. However, when the content of sum of the oxides of Mn, V and Cr is set to be 0.6 mol part in terms of $Mn_2O_3$, $V_2O_5$ and $Cr_2O_3$, as in samples 12 to 15, 75 to 77 and 137 to 139, the desired characteristics can be successfully attained.

Accordingly, it is preferable that the total amount of oxides of Mn, V and Cr ranges from 0.03 to 0.6 mol part in terms of $Mn_2O_3$, $V_2O_5$ and $Cr_2O_3$.

Further, it is to be noted that same effects can be obtained regardless of whether an oxide of one of the elements Mn, V and Cr is used alone or two or more thereof are used together as in samples 4 to 15, 66 to 77 and 128 to 139 as long as the total content thereof satisfies the above specified range.

Further, when the content of oxides of Mo and W is greater than 0.4 mol part in terms of $MoO_3$ and $WO_3$ as in the samples 25, 87 and 149, the tan δ thereof may be deteriorated over 10.0% and the capacitance variation $\Delta C/C_{25}$ exceeds the range from −80% to +30% with the temperature varying from −55° C. to +125° C. However, when the total content of oxides is set to be 0.3 mol part as in samples 24, 86 and 148, the desired electrical characteristics can be successfully obtained.

Accordingly, it is preferable that the total content of the oxides of Mo and W ranges from 0 to 0.3 mol part in terms of $MoO_3$ and $WO_3$.

Furthermore, same effects can be obtained regardless of whether the oxides of Mo and W are used separately as in samples 20 to 24 and 82 to 86 or used together as in samples 144 to 148.

When the ratio $Ba/(Ti_{1-x}Zr_x)$ is 0.997 as in the samples 53, 115 and 177, a highly densified ceramic body may not be obtained by the sintering at 1200° C.; whereas when the ratio $Ba/(Ti_{1-x}Zr_x)$ is 1.000 as in the samples 54, 116 and 178, the desired electrical characteristics can be successfully obtained.

Further, when the ratio $Ba/(Ti_{1-x}Zr_x)$ is 1.015 as in the samples 57, 119 and 181, the tan δ thereof may be deteriorated over 10.0% or the desired electrical characteristics can not be obtained; whereas when the ratio $Ba/(Ti_{1-x}Zr_x)$ is 1.010 as in the samples 56, 118 and 180, the desired electrical characteristics can be successfully obtained. Accordingly, the optimum range of the ratio $Ba/(Ti_{1-x}Zr_x)$ ranges from about 1.000 to about 1.010.

Ca or Sr can be used instead of Ba for adjusting the ratio $Ba/(Ti_{1-x}Zr_x)$. That is, as long as the ratio of the sum of Ba, Ca and Sr to $(Ti_{1-x}Zr_x)$. i.e., $(Ba+Ca)/(Ti_{1-x}Zr_x)$ ratio, $(Ba+Sr)/(Ti_{1-x}Zr_x)$ ratio or $(Ba+Ca+Sr)/(Ti_{1-x}Zr_x)$ satisfies the optimum range from 1.000 to 1.010, the desired characteristics can be obtained.

Still further, barium carbonate, barium acetate, barium nitrate, calcium acetate, strontium nitrate or the like can be used in controlling the ratios mentioned above.

Although the present invention has been described with reference to the multilayer ceramic capacitors in this specification, it will be apparent to those skilled in the art that the present invention is also applicable to a single layer ceramic capacitor.

When x is 0 in $Ti_{1-x}Zr_x$ as in the samples 58, 120 and 182, the dielectric constant $\epsilon_s$ becomes equal to or less than 10,000, whereas when x is 0.26 as in the samples 61, 123 and 185, the desired electrical characteristics can be obtained. Accordingly, the optimum range of x in $Ti_{1-x}Zr_x$ ranges about 0.05 to 0.26.

The present invention can produce a multilayer ceramic capacitor capable of providing a desired operating life with a highly improved reliability, wherein the capacitor exhibits a relative permittivity $\epsilon_s$ of 10,000 or greater, tan δ of 10.0% or less and a capacitance variation $\Delta C/C_{25}$ ranging from −80% to +30% within the temperature range from −55° C. to +125° C. In accordance with the present invention, there is provided a multilayer ceramic capacitor capable of providing a desired operating life with a highly improved reliability when the dielectric ceramic composition includes one or more oxides selected from the group consisting of oxides of Mo and W, the contents of the oxides being included therein in amounts ranging about 0.025 to 0.3 mol part by assuming that the oxides of Mo and W are $MoO_3$ and $WO_3$, respectively.

While the invention has been shown and described with respect to the preferred embodiments, it will be understood by those skilled in the art that various changes and modifications may be made without departing from the spirit and scope of the invention as defined in the following claims.

What is claimed is:

1. A dielectric ceramic composition comprising:
    100 mol part of an oxide of Ba, Ti and Zr, the content of the oxide of the Ba, Ti and Zr being calculated by assuming that the oxide thereof is $Ba(Ti_{1-x}Zr_x)O_3$;
    0.25 to 1.5 mol part of an oxide of Re, Re representing one or more elements selected from the group consisting of Sm, Eu, Gd, Tb, Dy, Ho, Er, Tm, Yb and Y, the content of the oxide of the Re being calculated by assuming that the oxide thereof is $Re_2O_3$;
    0.1 to 0.4 mol part of an oxide of Mg, the content of the oxide of the Mg being calculated by assuming that the oxide thereof is MgO; and 0.03 to 0.6 mol part of oxides of one or more elements selected from the group consisting of Mn, V and Cr, the contents of the oxides of the Mn, V and Cr being calculated by assuming that the oxides thereof are $Mn_2O_3$, $V_2O_5$ and $Cr_2O_3$, respectively, wherein a ratio of $Ba/(Ti_{1-x}Zr_x)$ ranges from about 1.000 to about 1.010 and x in $Ti_{1-x}Zr_x$ ranges from about 0.05 to about 0.26.

2. The dielectric ceramic composition of claim 1, wherein the dielectric ceramic composition further comprises one or more oxides selected from the group consisting of an oxide of Mo and an oxide of W, the contents of the oxides of Mo and W being calculated by assuming that the oxides of Mo and W are $MoO_3$ and $WO_3$, respectively and each of the contents of the oxides of Mo and W ranging about 0.025 to 0.3 mol part.

3. A ceramic capacitor comprising:

one or more ceramic dielectric layers, each of the ceramic dielectric layers including a dielectric ceramic composition of claim 1; and two or more internal electrodes, a dielectric layer being disposed between adjacent two internal electrodes.

4. The ceramic capacitor of claim 3, wherein the dielectric ceramic composition further comprises one or more oxides selected from the group consisting of an oxide of Mo and an oxide of W, the contents of the oxides of Mo and W being calculated by assuming that the oxides of Mo and W are $MoO_3$ and $WO_3$, respectively and each of the contents of the oxides of Mo and W ranging about 0.025 to 0.3 mol part.

* * * * *